(12) United States Patent
Kleinschmidt et al.

(10) Patent No.: US 6,477,187 B2
(45) Date of Patent: Nov. 5, 2002

(54) F2-LASER WITH LINE SELECTION

(75) Inventors: Jürgen Kleinschmidt, Weissenfels (DE); Peter Heist, Jena (DE); Frank Voss, Sanders-heim (DE); Andreas Görtler, Bamberg (DE)

(73) Assignee: Lambda Physik AG, Goettingen (DE)

( * ) Notice: Subject to any disclaimer, the term of this patent is extended or adjusted under 35 U.S.C. 154(b) by 0 days.

(21) Appl. No.: 09/924,814

(22) Filed: Aug. 7, 2001

(65) Prior Publication Data

US 2002/0015431 A1 Feb. 7, 2002

Related U.S. Application Data

(62) Division of application No. 09/317,695, filed on May 24, 1999.
(60) Provisional application No. 60/155,188, filed on Jun. 4, 1998, and provisional application No. 60/126,435, filed on Aug. 18, 1998.

(51) Int. Cl.[7] .............................................. H01S 3/098
(52) U.S. Cl. ............................. 372/19; 372/20; 372/57; 372/98; 372/100; 372/102
(58) Field of Search ............................. 372/19, 20, 100, 372/102, 98, 57

(56) References Cited

U.S. PATENT DOCUMENTS

| 3,868,592 A | 2/1975 | Yarborough et al. | 331/94.5 |
|---|---|---|---|
| 4,393,505 A | 7/1983 | Fahlen | 372/57 |
| 4,696,012 A | 9/1987 | Harshaw | 372/99 |
| 4,829,536 A | 5/1989 | Kajiyama et al. | 372/57 |
| 4,856,018 A | 8/1989 | Nozue et al. | 372/98 |

(List continued on next page.)

OTHER PUBLICATIONS

Kakehata, M. et al., "CTUH15 Experimental Study of Tunability of a Discharge Pumped Molecular Fluorine Laser," *CLEO90/Tuesday Poster*, pp. 106–108.

*Optics and Laser Technology*, vol. 11, No. 6, Dec. 1979, "CIF and $F_2$: two new nultra-violet laser systems," K. Hohla, M. Diegelmann, H. Pummer, K.L. Kompa, 6 pgs.

(List continued on next page.)

*Primary Examiner*—Leon Scott, Jr.
(74) *Attorney, Agent, or Firm*—Sierra Patent Group, LTd.; Andrew V. Smith

(57) ABSTRACT

An $F_2$-excimer laser has multiple closely-spaced spectral lines of interest around 157 nm, and one of the lines is selected by wavelength selection optics. The wavelength selection optics of a first preferred embodiment include a birefringent Brewster window enclosing the laser gas volume of the discharge chamber. The window preferably comprises $MgF_2$ and is located at one end of the discharge chamber. One line is selected of the two when the optical thickness of the window is selected in coordination with rotatably adjustable, orthogonal refractive indices of the window. The transmissivity of the window is dependent on the orthogonal refractive indices and the optical thickness of the window. The wavelength selection optics of a second preferred embodiment include are at least partially within the laser active volume. In this way, line selection is performed in a manner which optimizes the combination of optical and discharge efficiency, resonator size and cost. The wavelength selection unit preferably includes a prism having a front surface oriented at Brewster's angle and a back surface oriented to receive and reflect an ordinary refracted ray travelling within the prism at a right angle to the back surface. The back surface also preferably includes a highly reflective coating to serve as the highly reflective surface of the resonator. The wavelength selection unit preferably further comprises an adjustment component for adjusting the orientation of the prism and for enclosing the other end of the housing, opposite the outcoupling end.

9 Claims, 4 Drawing Sheets

U.S. PATENT DOCUMENTS

| | | | | |
|---|---|---|---|---|
| 4,947,398 | A | * 8/1990 | Yamada et al. | 372/32 |
| 4,975,919 | A | 12/1990 | Amada et al. | 372/33 |
| 4,977,563 | A | 12/1990 | Nakatani et al. | 372/32 |
| 5,081,635 | A | 1/1992 | Wakabayashi et al. | 372/57 |
| 5,095,492 | A | 3/1992 | Sandstrom | 372/102 |
| 5,150,370 | A | 9/1992 | Furuya et al. | 372/106 |
| 5,404,366 | A | 9/1995 | Wakabayashi et al. | 372/29 |
| 5,559,816 | A | 9/1996 | Basting et al. | 372/27 |
| 5,646,954 | A | 7/1997 | Das et al. | 372/55 |
| 5,684,822 | A | 11/1997 | Partlo | 372/95 |
| 5,761,236 | A | 6/1998 | Kleinschmidt et al. | 372/100 |
| 5,856,991 | A | 1/1999 | Ershov | 372/57 |
| 5,870,417 | A | * 2/1999 | Verdiell et al. | 372/20 |
| 5,901,163 | A | 5/1999 | Ershov | 372/20 |
| 6,240,110 | B1 | * 5/2001 | Ershov | 372/20 |
| 2002/0006148 | A1 | * 1/2002 | Govorkov et al. | 372/55 |
| 2002/0018505 | A1 | * 2/2002 | Basting et al. | 372/55 |
| 2002/0018506 | A1 | * 2/2002 | Vogler | 375/55 |
| 2002/0021729 | A1 | * 2/2002 | Vogler | 372/55 |
| 2002/0027936 | A1 | * 3/2002 | Govorkov et al. | 372/57 |
| 2002/0075932 | A1 | * 6/2002 | Sta | 372/57 |

OTHER PUBLICATIONS

*Applied Physics B Photo–physics and Laser Chemistry,* vol. B55, No. 1, Jul. 1992, "Influence of Cavity Configuration on the Pulse Energy of a High–Pressure Molecular Fluorine Laser," S.M. Hooker, A.M. Haxell, and C.E. Webb, 6 pgs.

*Highlights Lambdaphysik,* Apr. 1993, "Excimer laser based microstructuring using mask projection techniques," U. Sarbach and H.J. Kahlert, 4 pgs.

"High–power efficient vacuum ultraviolet $F_2$ laser excited by an electric discharge," V.N. Ishchenko, S.A. Kochubei, and A.M. Razhev, 3 pgs.

*Conference on Lasers and Electro–optics,* 1990 Technical Digest Series, vol. 7, May 21–25, 1990, Anaheim, California, "Spectroscopic comparison between low and high pressure discharge pumped Xe atomic lasers," K. Komatsu, E. Matsui, S. Takahashi, Fumiko Kannari, M. Obara, 30 pgs.

*Applied Physics Letters,* vol. 56, Jun. 25, 1990, No. 26, "High specific output energy operation of a vacuum ultra-violet molecular fluorine laser excited at 66 MW/cm$^3$ by an electric discharge," Masayuki Kakehata, Etsu Hashimoto, Fumihiko Kannari and Minoru Obara, 6 pgs.

*Journal of Applied Physics,* vol. 50, Jun. 1979, No. 6, "Novel neutral atomic fluorine laser lines in a high–pressure mixture of $F_2$ and He," Shin Sumida, Minoru Obara, and Tomoo Fujioka, 10 pgs.

*IEEE Journal of Quantum Electronics,* Nov. 1991, vol. 27, No. 11, "Efficiency Characterization of Vacuum Ultraviolet Molecular Fluorine ($F_2$) Laser (157 nm) Excited by an Intense Electric Discharge," Masayuki Kakehata, Tatsuya Uematsu, Fumihiko Kannari, and Minoru Obara, 10 pgs.

*Journal of Modern Optics,* vol. 37, No. 4, Apr. 1990, "Amplification characteristics of a discharge excited $F_2$ laser," C. Skordoulis, E. Sarantopoulou, S. Spyrou and A.C. Cefalas, 12 pgs.

*Optics Communications,* vol. 55, No. 6, Oct. 15, 1985, "Gain Measurements at 157 nm in an $F_2$ Pulsed Discharge Molecular Laser," A.C. Cefalas, C. Skordoulis, M. Kompitasas and C.A. Nicolaides, 6 pgs.

*Applied Physics Letters,* vol. 54, Feb. 13, 1989, No. 7, "High–power discharge–pumped $F_2$ molecular laser," Kawakatsu Yamada, Kenzo Miyazaki, Toshifumi Hasama, and Takuzo Sata, 6 pgs.

*Leos '89,* Lasers and Electro–Optics Society Annual Meeting Conference Proceedings, Oct. 17–20, 1989, Orlando, Florida, "High Power Discharge–Pumped $F_2$ Laser," K. Yamada, K. Miyazaki, T. Hasama, T. Sato, M. Kasamatsu, and Y. Mitsuhashi, 13 pgs.

*Journal of Applied Physics,* vol. 53, May 1982, No. 5, "Gain and saturation of the atomic fluorine laser," R. Sadighi–Bonabi, F.W. Lee, and C.B. Collins, 11 pgs.

*Conference on Lasers and Electro–Optics,* 1989 Technical Digest Series, vol. 11, May 24–28, 1989, Baltimore, Maryland, "Intense VUV–XUV generation from rare gas excimers," Wataru Sasaki, Kou Kurosawa, 23 pgs.

*Soviet Journal of Quantum Electronics,* 16(5) May 1986, "High–power efficient vacuum ultraviolet $F_2$ laser excited by an electric discharge," V.N. Ishchenko, S.A. Kochubei, and A.M. Razhev, 9 pgs.

*Optics Communications,* vol. 28, No. 1, Jan. 1979, "Discharge pumped $F_2$ Laser at 1580 Å", H. Pummer, K. Hohla, M. Diegelmann and J.P. Reilly, 6 pgs.

*Gas Flow and Chemical Lasers,* SPIE Vo. 1397, Sep. 10–14, 1990, "Frequency up–conversion of a discharge pumped molecular fluorine laser by stimulated Raman scattering in $H_2$," Masayuki Kakehata, Etsu Hashimoto, Fumihiko Kannari, and Minoru Obara, 16 pgs.

*The Journal of Chemical Physics,* vol. 69, Sep. 15, 1978, "An efficient, high power $F_2$ laser near 157 nm$^{a)}$," Joseph R. Woodworth and James K. Rice, 11 pgs.

*Verhandlungen,* Mar. 1990, Phsyikertagung Munchen, 1990, Optimierung der VUV–Emission bei 157 nm ($F_2$–Linie) bei entladungs—gepemten Excimerlasern, F. Voss, 2 pgs.

*Tagungsband,* Vom. 24, Bis. 26, Sep. 1991, Abstract: "Vakuum UV Molekullaser mit hoher Ausgangsleistung," 3 pgs.

*Applied Physics Letters,* vol. 51, No. 13, Sep. 28, 1997, "Theoretical evaluation of high–efficiency operation of discharge–pumped vacuum–ultraviolet $F_2$ lasers," Mieko Ohwa and Minoru Obara, 6 pgs.

*Applied Optics VUV VI,* vol. 19, No. 23, Dec. 1, 1980, "Vacuum ultraviolet excimer lasers," M.H.R. Hutchinson, 9 pgs.

*Review of Scientific Instruments,* vol. 56, No. 5, Part 1, May 1985, "Simple, compact, high–repetition rate XeCI laser," E. Armandillo, G. Grasso, and G. Salvetti, 7 pgs.

*Applied Physics Letters,* vol. 31, No. 1, Jul. 1, 1977, "vuv emissions from mixtures of $F_2$ and the noble gasses—A molecular $F_2$ laser at 1575 Å$^{a)}$," James K. Rice, A. Kay Hays, and Joseph R. Woodwsorth, 5 pgs.

*Applied Physics Letters,* vol. 63, No. 4, Jul. 26, 1993, "Small–signal gain measurements in an electron beam pumped $F_2$ laser," H.M.J. Bastiaens, B.MN.C. van Dam, P.J.M. Peters, and W. J. Witteman, 7 pgs.

*ZOS,* Akademie der Wissenschaften der DDR, Zentralinstitut fur Optik und Wissenschaften der DDR, Oktober 1987, "Leistungastarker atomarer Fluorlaser im roten Spektralbereich," Jurgen Lademann, Roland Kunig, Wadim Saidow, Rainer Weidauer, 12 pgs.

Discharge–Pumped Excimer Laser Research in Japan, Apr. 1988, "Theoretical simulation of a discharge pumped $F_2$ excimer laser," T. Uematsu et al. Keio U.

*Science Report, Lambdaphysik,* No. 3, Nov. 1990, "Breakthrough in $F_2$Laser Technology," 4 pgs.

Institut Fur Quantenoptik, Oct. 22, 1991, "Stimulated Raman scattering of a $F_2$–Laser in $H_2$," C. Momma, A. Tunnermann, F. Voβ, C. Windolph and B. Wellegehausen, 8 pgs.

*Highlights, Lambdaphysik,* No. 33, Feb. 1992, "VUV Stokes and Anti–Stokes Raman Lines Derived from an $F_2$ Laser," C. Momman, A Tunermann, F. Voβ, C. Windolph, and B. Wellegehausen, 5 pgs.

*Highlights, Lambdaphysik,* No. 43, Jan. 1994, "Photochemical modification of Fluorocarbon Resin to Generate Adhesive Properties," 6 pgs.

*Highlights Lambdaphysik,* No. 29, Jun. 1991, "VUV Spectroscopy by Frequency Tripling," 6 pgs.

"Processing of PTFE with High Power VUV Laser Radiation," D. Basting, U. Sowada, F. Vo_, P. Oesterlin, 3 pgs.

*Journal of Applied Physics,* vol. 81, No. 6, Mar. 1997, "Small–signal gain measurements in a discharge–pumped $F_2$ laser," Tahei Kitamura, Yoshihiko Arita and Keisuke Maeda, Masayuki Takasaki, Kenshi Nakamura, Yoshiano Fujiwara and Shiro Horiguchi, 12 pgs.

*Journal of Applied Physics,* vol. 77, Jan. 1–15, 1995, "Long pulse electron beam pumped molecular $F_2$Laser," F.T.J.L. Lankhorst, H.M.J. Bastiaens, H. Botma, P.J.M. Peters, and W.J. Witteman, 8 pgs.

*Applied Physics,* Vo. B33, No. 4, Apr. 1984, "Intense Laser Generation from an Atomic–Fluorine," I.G. Koprinkov, K.V. Stamenov, and K.A. Stankov, 5 pgs.

*Journal of the Optical Society of America,* vol. 64, No. 4, Apr. 1974, "Modes of a laser resonator containing tilted birefringent plates," Arnold L. Bloom, 7 pgs.

*High Power Laser & Particle Beams,* vol. 6, No. 4, Series No. 24, Nov. 15, 1994.

*SPIE—The International Society for Optical Engineering,* Excimer Beam Applications, vol. 998, Sep. 6, 1988, Boston, Massachusetts, "Narrow–band KrF excimer laser—tunable and wavelength stabilized," Koich Wani, Yoshiro Ogata, Yoshiaki Watarai, Takuhiro Ono, Takeo Miyata, Reiji Sano, and Yasuaki Terui, 10 pgs.

*Conference on Lasers and Electro–Optics,* 1989 Technical Digest Series, vol. 11, Apr. 24–29, 1989, Baltimore, Maryland, "Line–narrowed industrial excimer laser for microlithography," R.K. Brimacombe, T.J. McKee, E.D. Mortimer, B. Norris, J. Reid, T.A. Znotins, 24 pgs.

*Applied Optics,* Aug. 1968, vol. 7, No. 8, "Theory of Multiplate Resonant Reflectors," J.K. Watts, 3 pgs.

*Applied Physics,* 1978, "Nitrogen–Laser–Pumped Single–Mode Dye Laser," S. Saikan, 4 pgs.

*Optics Communications,* vol. 14, No. 1, May 1975, "Electronic Tunig of Dye Lasers by an Electrooptic Birefringent Fabry–Perot Etalon," Masakatsu Okada and Shogo Ieiri, 7 pgs.

* cited by examiner

F2-LASER WITH LINE SELECTION

PRIORITY

This Application is a 37 C.F.R. 1.53(b) divisional application which claims the benefit of priority to U.S. patent application Ser. No. 09/317,695, filed May 24, 1999, which claims the benefit of priority to U.S. provisional patent application No. 60/155,188, filed Jun. 4, 1998, and No. 60/126,435, filed Aug. 18, 1998.

BACKGROUND OF THE INVENTION

1. Field of the Invention

The invention relates to a line selecting optical arrangement for an excimer laser, and more particularly to an optical arrangement for selecting fewer than all of multiple closely-spaced emission lines of an $F_2$-laser.

2. Discussion of the Related Art

The field of technologies potentially benefitting from the use of excimer lasers is advancing, as is the number and versatility of excimer lasers themselves. An important excimer laser is the $F_2$-laser which emits at wavelengths between 157 nm and 158 nm. Other excimer lasers include such rare gas-halide lasers as XeCl-(308 nm), KrF-(249 nm), ArF-(193 nm), KrCl—(222 nm), and XeF-lasers (350 nm). Several mercury-halides are also used as active gases in excimer lasers, such as HgBr. When the term "excimer laser" is used hereafter in this application, including in the claims, it is meant to refer to any of the lasers mentioned above, and to any other laser which one skilled in the art would label as an excimer laser. Even $N_2$, $N_2^+$, $CO_2$, and atomic fluorine may be used as active media within excimer laser discharge chambers. As is apparent, many excimer lasers radiate at ultraviolet wavelengths making them desirable for use as lithography tools.

Semiconductor manufacturers are currently using deep ultraviolet (DUV) lithography tools based on KrF-excimer laser systems which will be followed by the next generation of ArF-excimer laser systems operating around 193 nm. Vacuum UV (VUV) lithography is expected to use the $F_2$-excimer laser operating around 157 nm.

The output of an $F_2$-laser has been tuned advantageously using prisms inside the laser resonator. See M. Kakehata, E. Hashimoto, F. Kannari, M. Obara, U. Keio Proc. of CLEO-90, 106 (1990). The prism of Kakehata et al. is an extra optical element arranged in the resonator setup along with each of several other components conventionally used with the arrangement.

The output emission spectrum of the $F_2$-laser is characterized by multiple lines including two closely-spaced lines at $\lambda_1 = 157.629$ nm and $\lambda_2 = 157.523$ nm. These two lines are closely spaced. Each line has a linewidth of around 15 pm (0.015 nm). FIG. 1 illustrates these two closely-spaced peaks of the $F_2$-excimer laser spontaneous emission spectrum. The intensity ratio between the two lines is $I(\lambda_1)/I(\lambda_2) \approx 7$ (See V. N. Ishenko, S. A. Kochubel, and A. M. Razher, Sov. Journ. QE-16, 5 (1986)).

Integrated circuit device technology has entered the submicron regime, thus necessitating very fine photolithographic techniques. The output emission spectrum of the $F_2$-laser including the two lines $\lambda_1$ and $\lambda_2$ has a bandwidth of at least 106 pm. However, it is desired to use an $F_2$-laser, e.g., for lithography, due to its short wavelength, but a far narrower bandwidth is needed.

Additionally, $F_2$-excimer lasers are characterized by relatively high intracavity losses, due to absorption and scattering in gases and all optical elements. The short wavelength is responsible for these high absorption and scattering losses. Therefore, advisable steps taken to optimize efficiency within the resonator often entail high costs.

SUMMARY OF THE INVENTION

It is an object of the invention to provide a radiation source which is useful for material processing at wavelengths around 157 nm, such as may be provided by an $F_2$-laser. It is a further object to provide optics for greatly narrowing the linewidth of the $F_2$-laser, and a method for producing this narrow linewidth. It is a further object to provide an $F_2$-laser with minimal optical losses and a small resonator setup. Such an arrangement would be advantageous in VUV-lithography and VUV-spectroscopy.

The present invention meets the aforementioned objects by providing an optical arrangement which selects one or more, and preferably one, of multiple closely-spaced spectral lines of a laser, particularly an excimer laser, and more particularly an $F_2$-laser. The laser has a discharge chamber containing a laser active gas, an optical resonator and a pair of spaced-apart electrodes for generating a output beam. The characteristic output beam of an $F_2$-laser includes multiple closely-spaced spectral lines in a wavelength range between 157 nm and 158 nm, whereas the $F_2$-laser of the present invention includes an optical arrangement that selects one of these lines. The optical arrangement may also be used for selecting one or more lines of another laser having multiple closely-spaced lines in its characteristic output emission spectrum, thus narrowing its linewidth.

For the $F_2$-laser, the selected line is preferably located at approximately 157.629 nm, and a second line of the multiple closely-spaced spectral lines located at approximately 157.523 nm is not included in the output emission spectrum of the laser, i.e., it is selected out. The wavelength selection optics may include one or more of a birefringent plate, a prism, an etalon and a grating.

If a birefringement plate is used, its thickness is determined by the refractive indices of the plate such that fewer than all of the multiple spectral lines are transmittable through the plate. The plate preferably encloses a gas volume of the laser and thus serves as an opto-mechanical window for the discharge chamber. In a preferred embodiment, a single line of the $F_2$-laser is selected by using a birefringent material to form the discharge chamber window. The window is oriented at Brewster's angle to the optical path. The preferred material for forming the window is magnesium fluoride ($MgF_2$).

In the field of dye lasers, birefringent Brewster plates have been used for wavelength tuning and line narrowing. See U.S. Pat. No. 3,868,592 to Yarborough et al. In the technique of Yarborough et al., a quartz crystal birefringent Brewster plate is placed in an optical cavity of a dye laser. The birefringent nature of the quartz crystal causes an emission spectrum of the dye laser to be narrowed. Tuning is performed by rotating the plate about an axis normal to the surface of the plate, while maintaining the plate at Brewster's angle to the optical axis of the dye laser system. Multiple plates are also used wherein each plate has a thickness that is an integral multiple of the thickness of the thinnest plate, for further line narrowing and for spectral distancing of periodically selected lines.

In contrast, in the above aspect of the present invention, a birefringent Brewster window within the resonator closes an excimer laser gas volume obviating the need for an additional optical window, and thereby advantageously reducing optical losses and geometrical size of the excimer laser. Additionally, $MgF_2$ is chosen as the birefringent material for forming the window. $MgF_2$ is advantageously both resistant to fluorine corrosion and transparent to the important UV and Deep UV, particularly at the 157 nm line of the $F_2$-excimer laser.

In an alternative to the preferred arrangement, more than one birefringent plate is aligned along the optical path. Successive plates aligned along the path have optical thicknesses equal to integral values of the thickness of the first plate. Preferably, successive plates have optical lengths twice as great as preceding ones. The alternative arrangement which incorporates this preferred feature has the advantage of greater line narrowing over other configurations.

Another arrangement in accord with the present invention includes a discharge chamber, an optical resonator including an outcoupling unit for partially reflecting incident light back along an optical axis, and a laser active volume within a housing for emitting a broad spectral band of light, wherein the laser active gas fills the discharge chamber. The arrangement further includes a wavelength selection unit within the housing, and preferably within the discharge chamber. In this way, line selection is performed in a manner which optimizes the combination of optical and discharge efficiency, resonator size and costs. The wavelength selection unit is preferably a prism, but may also be a grating, an etalon, a birefringent plate, or another wavelength selecting optical device.

DETAILED DESCRIPTION OF THE PREFERRED EMBODIMENTS

A laser having two or more closely-spaced spectral emission lines can be useful in high precision photolithography if one line can be selected and the others efficiently suppressed. The emission of the $F_2$-excimer laser includes multiple characteristic lines around 157 nm including $\lambda_1=157.629$ nm and $\lambda_2=157.523$ nm. Therefore, it would be advantageous to select one of the multiple lines, e.g., $\lambda_1$, for its use in lithography systems. In this way, the output emission bandwidth of the $F_2$-laser would be reduced to around 10–20 pm, or around the linewidth of either of $\lambda_1$ or $\lambda_2$.

First Preferred Embodiment

Figure 1:
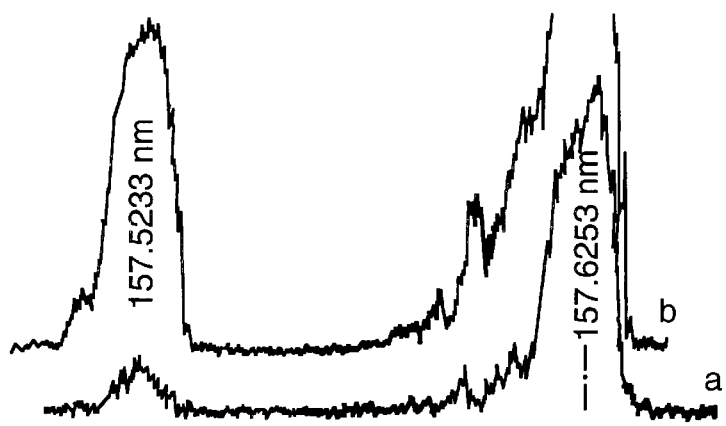
FIG. 1 shows an emission spectrum of an $F_2$-excimer laser including two closely-spaced lines around 157 nm.
Figure 2A:
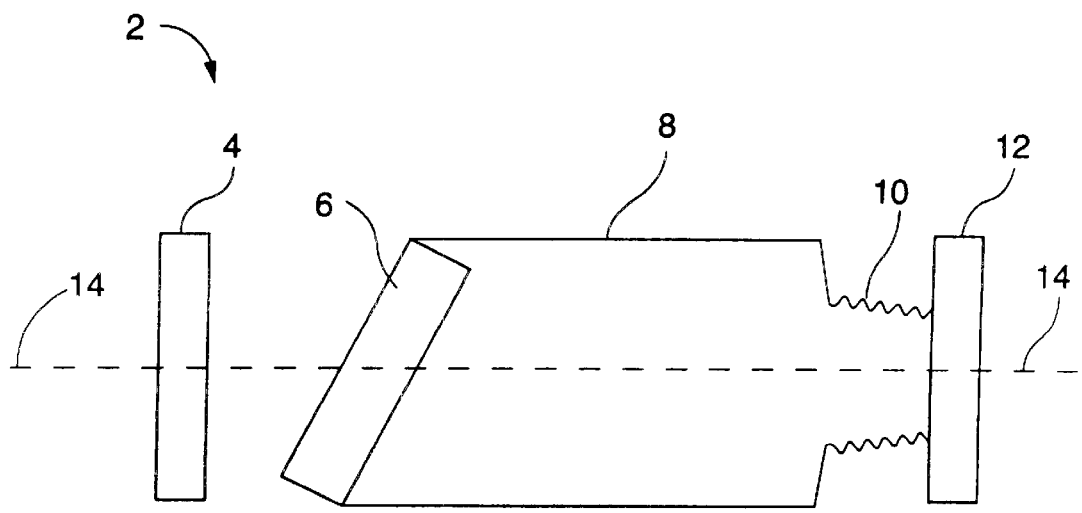
FIG. 2A shows an optical arrangement in accord with a first preferred embodiment of the present invention.

FIG. 2A shows an optical arrangement 2 including a high reflectivity mirror 4, a birefringent plate 6, a discharge chamber 8, a vibration coupling element 10 and an outcoupling mirror 12. Each element of the optical arrangement 2 is preferably selected to perform optimally at ultraviolet wavelengths including those used in DUV and VUV lithography.

In a preferred embodiment, the optics are selected for maximum optical performance for wavelengths around 157–158 nm using an $F_2$-excimer laser system for VUV lithography. Other wavelengths are around 248 nm and 193 nm for DUV lithography using KrF- and ArF-excimer laser systems, respectively. The arrangement 2 may further be modified for use with other excimer laser systems emitting at differing emission wavelengths. Examples include ultraviolet emitting excimer lasers such as those incorporating the active gas media KrCl (222 nm), XeCl (308 nm), or XeF (350 nm). Examples of excimer lasers emitting in the visible range include those incorporating the active media HgBr (502–504 nm) or atomic fluorine. Nitrogen, i.e., $N_2$ (332 nm) or $N_2^+$ (visible), may be incorporated as an active gas within an excimer laser. $CO_2$ is also incorporable as an active gas media within an excimer laser, although it emits at infrared wavelengths. When so used, optical components of the arrangement 2 may be modified, e.g., to comprise different materials, to optimize their optical efficiencies at those different wavelengths.

The birefringent plate 6 is preferably made of $MgF_2$-optical material, particularly when the optical arrangement 2 is used in a $F_2$-laser system. Other excimer lasers such as ArF or KrF-lasers may also be enhanced with the preferred $MgF_2$-material of the preferred optical arrangement 2 of the present invention. $MgF_2$ exhibits a high damage threshold including high resistance against fluorine, and high transmissivity at DUV and VUV wavelengths, making it an optically, chemically and mechanically attractive material for use with $F_2$-, ArF- and KrF-excimer laser systems. The plate 6 may be substituted with one comprising another material, if that plate exhibits similar properties to those described here which have the advantages of the present invention. An example of such a material is sapphire ($Al_2O_3$) for ArF- or KrF-excimer laser systems, although sapphire has sufficient transmissivity only above 180 nm and is thus not desirable for use with line selection around 157 nm.

The plate 6 preferably has two coplanar surfaces each aligned at Brewster's angle to the optical axis 14 of the arrangement 2. Placing the plate 6 at Brewster's angle to the incident beam provides a way to minimize optical losses through reflection from surfaces of the plate 6. Such placement also prevents interference between beams reflected from the two surfaces of the plate 6, known as "etalonning". As etalonning is sometimes desirable, e.g., to produce further line narrowing, the alignment of the plate 6 may be modified to meet system performance needs.

In that regard, an etalon may alternatively be selected, rather than the birefringent plate 6, as the wavelength selection unit for selecting the one or more, and preferably only one, of the multiple closely spaced lines of the laser. In fact, one or more prisms and/or a grating may also alternatively be used instead of the grating. Also, a combination of any two or more of the plate 6, an etalon, one or more prisms and a grating may be used for line selection between the closely-spaced spectral lines of the laser.

Figure 2B:
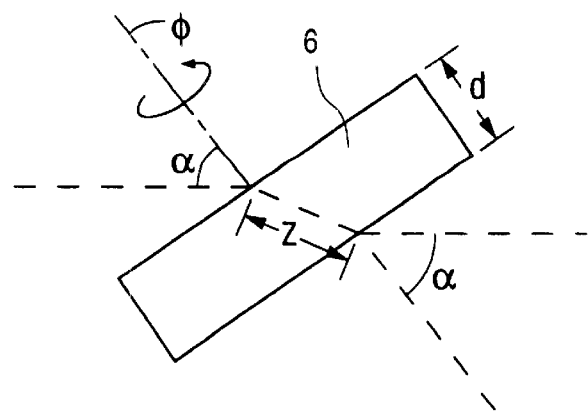
FIG. 2B shows a birefringent plate in accord with the first preferred embodiment of FIG. 2A.

Referring to FIG. 2B, the angle shown as α is Brewster's angle in the preferred embodiment of the present invention. For example, the preferred birefringent material $MgF_2$ has an ordinary index of refraction $n_o=1.467$ and an extraordinary index of refraction $n_e=1.481$, for orthogonal polarization components aligned parallel and perpendicular to the main cut of the crystal, respectively. The Brewster angles for each of these ordinary and extraordinary components are then α=55.7 and 56 degrees, respectively obtained from the generic formula $α=\tan^{-1}(n)$ and the assumption that the atmosphere outside the plate 6 has a refractive index of unity.

By aligning the plate at Brewster's angle, a transmission coefficient for π-polarized light ($τ_π$, i.e., light polarized parallel to the plane of incidence), travelling along the optical axis 14 and impinging the plate 6, is close to unity because there are no reflective losses. Optical losses are thus advantageously minimized for π-polarized components of light in the optical arrangement 2, and are almost exclusively limited to small absorption losses. Operation of a laser including the optical arrangement 2 will result in the emission of a significantly π-polarized laser beam. It should be noted however that the σ-polarization component is not negligible or zero for an excimer or dye laser setup, as it would be for a laser system wherein light passes through the plate 6 hundreds of times, or as it would be if conventional polarizer plates were substituted for the Brewster alignment of the surfaces of the plate 6. Each of the two surfaces of the plate 6 acts to enhance the ratio of the π-component of the incident beam polarized in the plane of incidence of the optical arrangement 2 to the σ-component polarized perpendicular thereto, wherein such π-polarized light is already perpendicular to the optical axis 14.

The transmittance of light through the birefringent plate 6, wherein the plate 6 has different indices of refraction in two orthogonal directions each aligned at, e.g., 45 degrees to the direction of polarization of the light is given by:

$$T(λ)=\cos^2[π(n_e-n_o)z/λ] \quad (1);$$

where $n_e$ is the index of refraction for the extraordinary ray, or that component of the refractive index of the plate 6 directed parallel to the σ-polarization component of the incident ray, $n_o$ is the index of refraction for the ordinary ray, or that component of the refractive index of the plate 6 directed parallel to the π-polarization component (i.e., perpendicular to the σ-polarization component), z is the geometric pathlength of the light in the plate 6, and λ is the wavelength of the light.

Referring to FIG. 2B, the geometric pathlength z of, e.g., the ordinary ray can be calculated from the thickness of the crystal d, and from Snell's and Pythagorus' laws. The resulting formula is given by:

$$z=d/(1-n_o^2 \sin d^2α)^{1/2} \quad (2);$$

where once again the refractive index outside the plate 6 is approximated to be unity.

As suggested in FIG. 2B, rotation of the plate 6 about an axis φ causes the difference between the respective indices $n_e$ and $n_o$ of the plate 6 to change, thus changing the selected wavelength of maximum transmission for a given thickness, as seen in (1). Yarborough et al. in fact points out that the effective extraordinary index $n_e$ changes when the plate is rotated about the φ axis, whereas the ordinary index $n_o$ does not. Thus, a plate 6 satisfying (1) in a first orientation with respect to the φ axis will select a first wavelength λ for transmission around 157 nm for a given window thickness d. A plate 6 selected for use in the optical arrangement 2 which satisfies (1) will select a different, or second, wavelength λ' for the same window thickness d when the plate 6 is rotated about the φ axis to a second orientation. A practical effect of this is realized in that a plate of given thickness d may be rotated about the φ axis to optimize its optical alignment when it is desired to select a particular wavelength. In a preferred embodiment, the plate 6 is oriented about the φ axis to select only the 157.629 nm line, and not the 157.523 nm line, of the $F_2$-excimer laser.

Referring to FIG. 2A, a birefringent plate 6 of a preferred embodiment is a window located at one end of the discharge chamber 8 of the laser. As a discharge chamber window, the plate 6 serves multiple functions in the optical arrangement 2. The plate 6 closes the laser gas volume, partially polarizes the light beam while minimizing optical losses, and, last but not least, performs wavelength selection. Such multipurpose optical elements are highly desired and sought after because the geometrical size of the resonator is reduced and optical losses are minimized.

The space located between the plate 6 and the mirror 4 is either evacuated or filled with a gas which is non-photoabsorbant at wavelengths of interest in the system of the preferred embodiment. The gas could be $N_2$, as suggested by Kakehata et al., or an inert gas such as Argon. The space preferably contains a zero percent concentration of $O_2$ gas to avoid Schumann-Runge band photoabsorption. The mirror 4 may be a multilayer dielectric coated total reflector.

A vibration decoupling element 10 is located near the other end of the chamber 8. The chamber 8 has an outcoupling mirror 12, located at the same end at which the vibration decoupling element 10 resides, which is partially reflective and partially transmissive according to conventional excimer laser technology. As such, the outcoupling mirror 12 may comprise $MgF_2$. The chamber 8 is filled with a gaseous mixture of the active material, e.g., $F_2$, and a buffer gas, e.g., He or Ne.

Figure 3A:
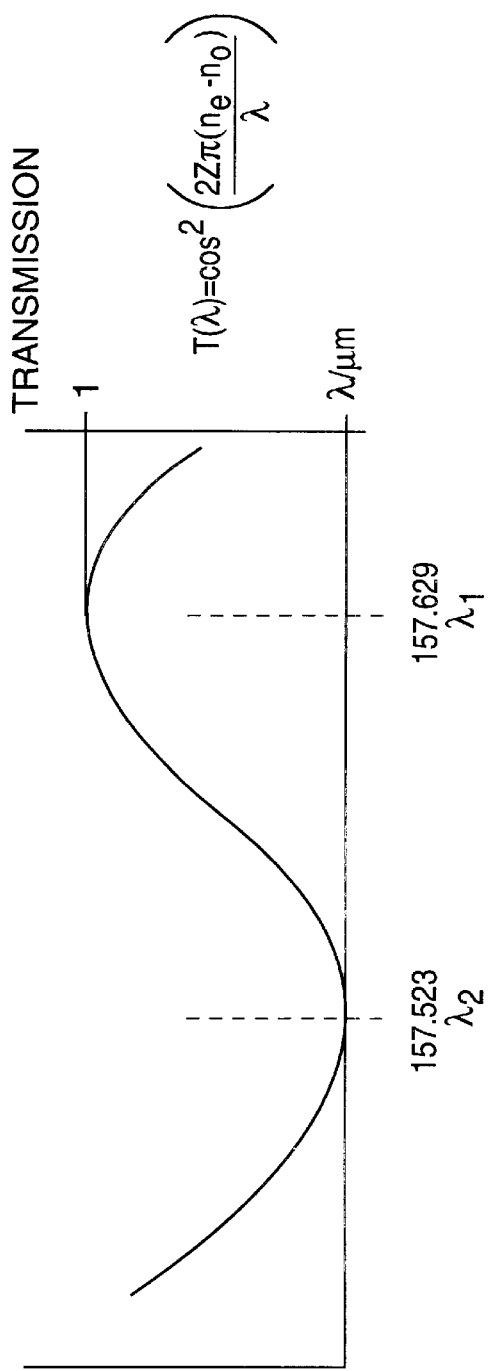
FIG. 3A is a graph of transmittance vs. wavelength for the birefringent plate of FIGS. 2A and 2B.
Figure 3B:
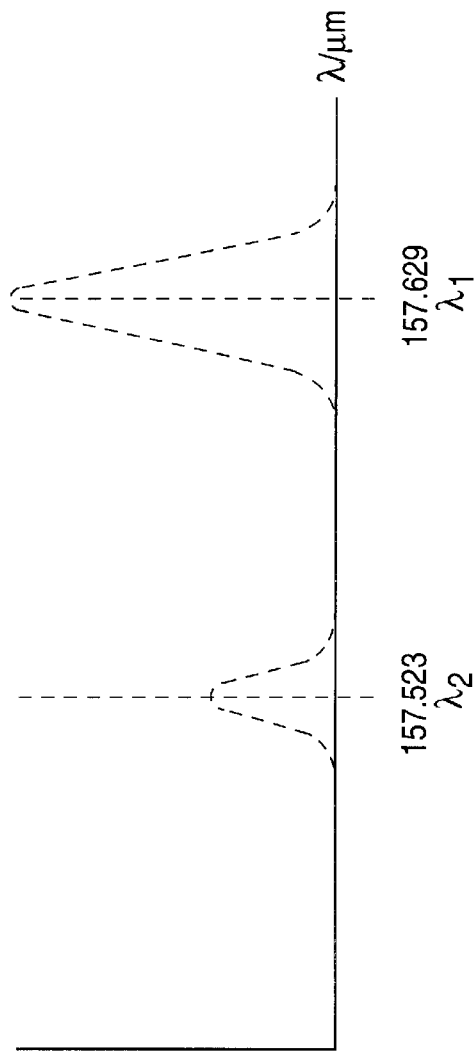
FIG. 3B is a graph illustrating emission intensity versus wavelength for a $F_2$-laser prior to selection by the birefringent plate of FIGS. 2A and 2B.

FIG. 3A shows a graph of the transmittance formula (1) as a function of wavelength λ. FIG. 3B shows a graph of the emission intensity of an $F_2$-excimer laser in accord with the preferred embodiment, but before any wavelength selection is performed by the plate 6. At the preferred thickness d of the plate 6 having refractive indices $n_e$ and $n_o$, the transmittance of the plate 6 has a minimum at $λ_2$=157.523 nm and a maximum as $λ_1$=157.625 nm. The emission line $λ_1$ is thus selected and maximally transmitted and the emission line $λ_2$ is maximally reflected away from the optical axis. As can be seen from the transmittance curve of FIG. 3A, line narrowing can be alone performed with the preferred arrangement when, e.g., a different laser is used and there is only one broad line of emission from the discharge chamber of the laser.

As an example, using a $F_2$-laser and a $MgF_2$-plate having a thickness d=3.21 mm, the geometrical pathlength will be z=3.9 mm. Taking $n_e-n_o$=0.015, λ=157.629 nm and $λ_1-λ_2$= 106 pm, the optical arrangement 2 provides the transmittance curve shown in FIG. 3A. For other laser optical arrangements, the transmittance curve would remain similar to that in FIG. 3A, but the numbers would change.

Figure 4:
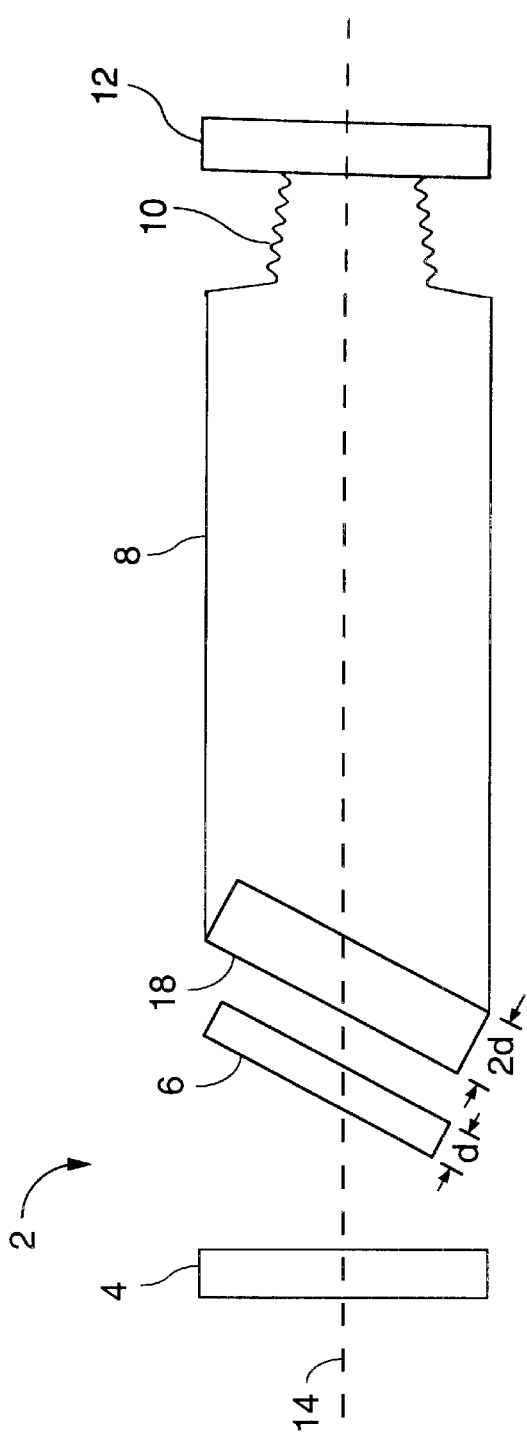
FIG. 4 shows an optical arrangement including a pair of birefringent plates in accord with an alternative to the first preferred embodiment of the present invention.

FIG. 4 shows an optical arrangement 16 in accord with a first alternative embodiment of the present invention. The arrangement 16 has a second birefringent plate 18 and differs thereby from the preferred optical arrangement 2. When two tuning plates 6 and 18 are used as in FIG. 4, each at Brewster's angle to the incident beam, the transmittance peaks are narrower and more distantly spaced than when only one plate 6 or 18 is used. Optimally, the first plate 6 continues to have the thickness d and the second plate 18 has the thickness 2d, although the second plate 18 may have another thickness equal to an integer multiple of the thickness d. In contrast to the arrangement shown in FIG. 4, the first plate 6 may alternatively serve as the Brewster window with the second plate 18 being aligned either as the closest of the two plates to the high reflectivity mirror 4, or at the other end of the chamber 8. The second plate may even be used to seal the discharge chamber at the opposite end of the chamber 8, such that the plates 6 and 18 each seal the discharge chamber. Although Bloom ("Modes of a Laser Resonator Containing Tilted Birefringent Plate", JOSA 64, 447, 450 (1974)) teaches that the best configurations of a dual plate system are usually those in which the thickest plate is nearer to the end mirror, no such arrangement is understood to be crucial and thus other arrangements of the first and second plates 6 and 18 may be used in accord with the present invention.

More than two plates may be used. For any number of plates, if the plates are arranged having consecutive thicknesses which are twice those of the next previously aligned plate, the transmittance of the system of plates will satisfy the equation:

$$T(\lambda) = \frac{\sin^2(2^j \pi (n_e - n_o) z / \lambda)}{4^j \sin^2(\pi (n_e - n_o) z / \lambda)} \quad (3)$$

where j is the number of plates having relative and successive thicknesses d, 2d, 4d . . . , $2_n$d. Of course, multiple plates may relate by any integral multiple of thicknesses, d, but formula (3) yields as optimal and preferred arrangement.

Figure 5:
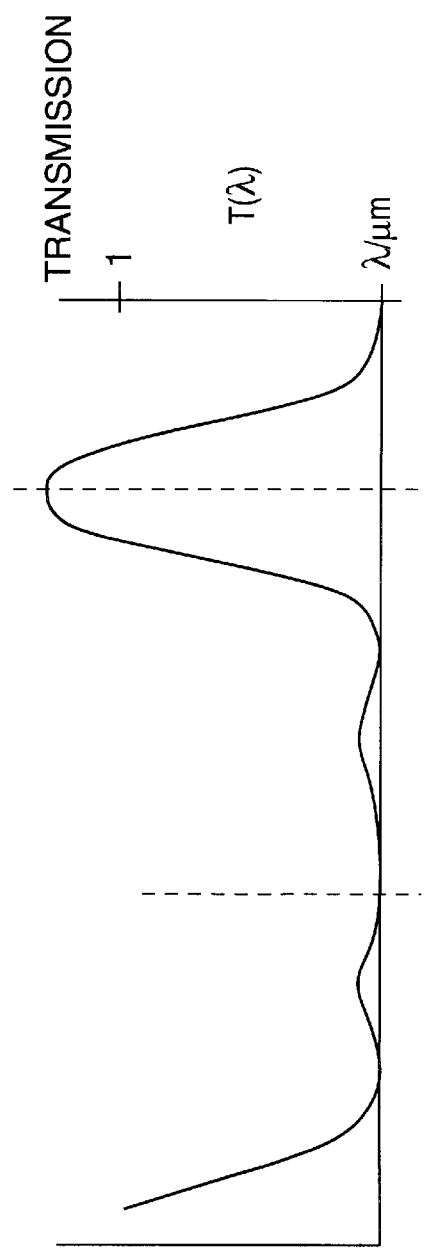
FIG. 5 is a graph of transmittance vs. wavelength for the pair of birefringent plates of FIG. 4.

The transmittance of the optical arrangement 16 of the first alternative embodiment of FIG. 4 is shown in FIG. 5. FIG. 3B again shows the emission intensity of the $F_2$-laser before wavelength selection is performed by the plates 6 and 18. FIG. 5 shows that when aligned properly, the combination of first plate 6 and the second plate 18 of the optical arrangement 16 substantially transmits the $F_2$-laser emission line $\lambda_1$=157.629 nm. At the same time, the insertion into the optical arrangement of the combination of the first plate 6 and the second plate 18 results in a significantly reduced, if not zero, transmittance at $\lambda_2$=157.523. Thus, nearly all of the intensity of the $\lambda_1$ line is transmitted, while nearly all of the intensity of the $\lambda_2$ line is reflected away from the optical axis.

The multiple plate arrangement 16 of FIG. 5 is more bulky than the single plate arrangement 2 of FIG. 2A. However, the multiple plate arrangement 16 has the advantage that it produces narrower linewidths than the single plate arrangement 2. This is apparent from an inspection of equation (1) and (3), e.g., noting that the argument of the sinusoid in (3) is larger than that is (1).

As can be deduced from formula (3), three or more plates may be arranged having thicknesses in consecutive order of d, 2d, 4d . . . , $2^n$d. When so arranged, the combination of these multiple birefringent plates within an optical arrangement substantially similar to that described in previous embodiments of the present invention will yield substantially total transmission at $\lambda_1$, while transmitting substantially zero intensity at $\lambda_2$. An advantage of adding further plates is that the arrangement narrows linewidths further. The drawback of adding further plates is, however, that the arrangement could become too bulky, and thus the desire to achieve a small resonator setup could be thwarted. Also, optical losses not contemplated by equations (1) and (3) would be multiplied, and the optical setup could become too lossy to achieve the desire of having minimal optical losses.

In summary regarding the first preferred arrangement, the arrangement 2 of FIG. 2A performs line selection adequate to solve the $F_2$-excimer laser double emission line problem around 157 nm. The arrangement 2 further achieves this objective while minimizing optical losses thanks to Brewster's law. In addition, by serving as a window enclosing the laser gas volume of the discharge chamber, additional optical needs are obviated. Moreover, as the preferred composition of the plate 6 is $MgF_2$, transmission around 157 nm is high and corrosion from the $F_2$-gas is minimized. The first alternative arrangement 16 achieves the desired line selection and a narrower line width than the arrangement 2 of the preferred embodiment, but the arrangement 16 utilizes an additional plate 18, causing more bulk than the preferred arrangement 2 provides.

Second Preferred Embodiment

Line tuning, narrowing and/or selection optics are integrated into the resonators of $F_2$-lasers, as well as nearly all other lasers, excimer or otherwise. Such line tuning, narrowing and/or selection is advantageous because extra resonator line tuning, narrowing and/or selection is inefficient because only a small portion of the total laser output is selected by the special external optics. The second preferred embodiment includes line tuning, narrowing and/or selection optics within the laser chamber which is filled with laser gas. Thus, the aforementioned optical elements are "intracavity".

Moreover, it is often advisable to provide a beam delivery path which is efficiently evacuated to less than, e.g., $10^{-3}$ millibar. This reduced pressure through efficient evacuation diminishes optical absorption via oxygen and other gas molecules in the air. Efficient evacuation also reduces reflective and absorptive losses as well as stray light losses from dust and other particles often present in unevacuated gas volumes such as ordinary air.

When additional optics are to be used, e.g., for a reason specific to the nature of the laser arrangement or output beam characteristics, or to the nature of the material processing or experimentation being performed using the laser arrangement, the installation of evacuatable optics blocks may entail a substantial cost. The $F_2$-excimer laser arrangement, for example, includes additional line selection optics for operation at a narrow wavelength around one of two or more closely-spaced output emission lines. Excimer lasers in general are an example that, due to their characteristically broad spontaneous emission spectrum, typically utilize additional line narrowing and tuning optics in many applications.

At various points along the beam delivery path, within the resonator, or the discharge chamber which encloses the laser active medium, it is desirable or typical to separate one volume from another. For example, the laser active gas is enclosed within its own volume to prevent its escape and to avoid its degradation. However, the resonating beam must pass through the gas volume and into a separated volume, e.g., enclosing an evacuatable optics block. In that case, the beam must pass through a window between the two volumes. Losses invariably occur even when meticulously grown and finely ground crystalline materials having highly transparent optical properties around relevant emission wavelengths are used for these windows. Such phenomena as absorption and dispersion typically occur to at least some finite degree.

Each of these problems is recognized as present in conventional optical excimer laser arrangements. Each problem is advantageously addressed in the excimer laser arrangement of the present invention.

Figure 6:
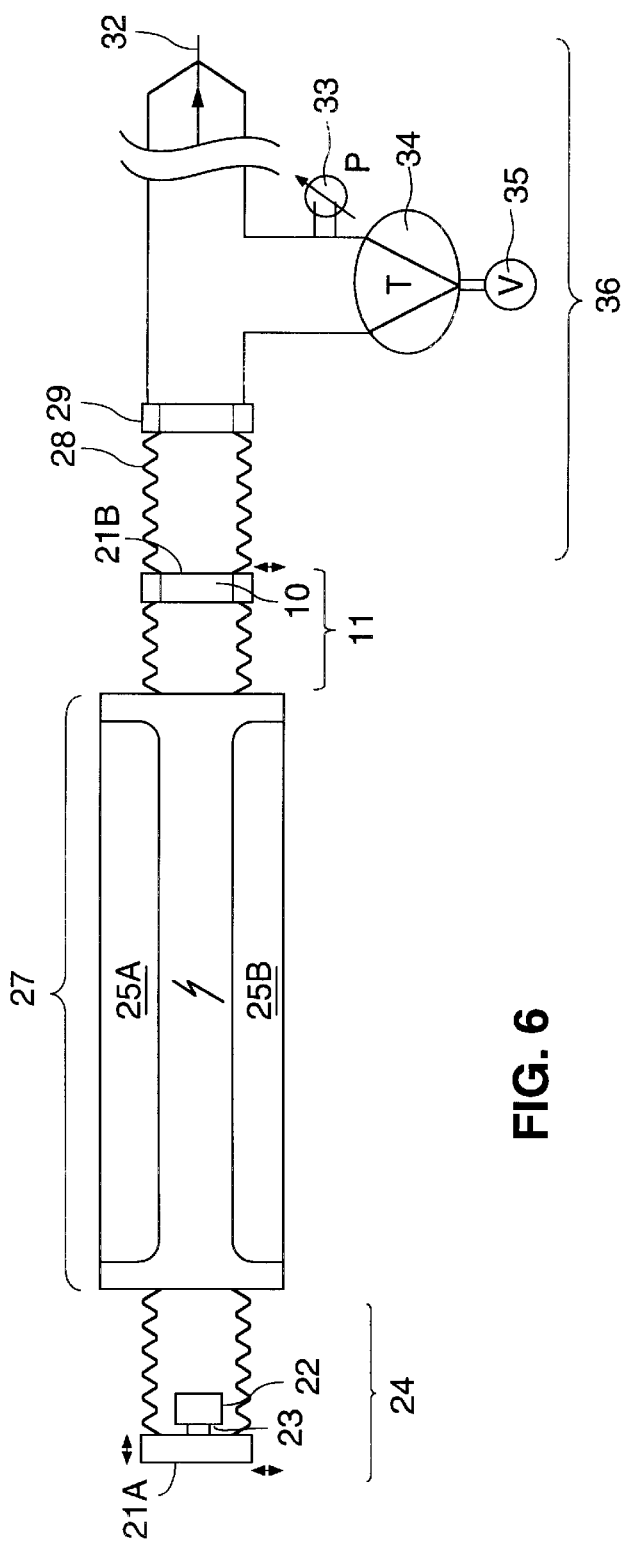
FIG. 6 shows an arrangement of an excimer laser according to a second preferred embodiment of the present invention.

FIG. 6 shows a $F_2$-laser arrangement in accord with the preferred embodiment of the present invention. The excimer laser of FIG. 6 comprises a discharge chamber 27 including electrodes 25A and 25B. The discharge chamber serves to excite $F_2$ molecules into an excited molecular state. The discharge chamber is located within a resonator defined by a highly reflective surface 23 and an outcoupling mirror 30. An evacuated laser beam path 36 is shown including a galvanic separation component 29.

UV-preionization of the electrical discharge laser is also provided and may be realized by means of an array of spark gaps or by another source of UV-radiation (surface, barrier or corona gas discharges), disposed in the vicinity of at least one of the solid electrodes of the main discharge of the laser. A preferred preionization unit is described in U.S. patent application Ser. No. 09/247,887 which is hereby incorporated by reference into this present application.

At left in FIG. 6 is a wavelength selection unit 24 for selecting one of two closely-spaced lines of an excimer laser, and preferably of a $F_2$-excimer laser around 157 nm. The wavelength selection unit 24 comprises at least one dispersive optical element. A typical arrangement might include a grating, or one or more prisms and a highly reflective mirror, or one or more prisms and a grating. The wavelength selection unit 24 of the present invention integrated into the discharge chamber 27, and is thus immersed in the laser gas of the discharge chamber 27. This integration avoids a long resonator, as well as transmission losses for the VUV-radiation by additional windows. Additionally, the costs of producing and maintaining the laser chamber and the vacuum system are reduced.

The wavelength selection unit 24 is orientationally adjustable using a first alignment mount 21A, which is preferably an adjustable holder for setting a desired wavelength. Preferably, the alignment mount 21A may be used to adjust the orientation of the wavelength selection unit 24 in three translational directions and/or in both spherically rotational directions. Optical elements of the wavelength selection unit 24, such as a mirror and/or a grating are adjusted in order to build an optical resonator together with the output mirror 30. A standard mirror mount can be used as this first alignment mount 21A. For line selection, at least one optical element of the wavelength selection unit 24 is rotated. This can be done using a motor drive or drive unit such as, e.g., a stepping motor or a D.C. motor). At least part of the mirror mount is designed for operation within the laser gas.

One preferred technique is the following. A base plate of the mirror mount of a second alignment mount 21B and a motor drive unit are located outside the laser gas. An adjustable plate of the mirror mount is equipped with the mirror 30. Two metal bellows are attached to the adjustable plate. The other ends of the metal bellows are attached to the laser tube, and respectively to the evacuated or purged beam path. These bellows are leak tight and over-pressure resistant. The same holds for the sealing of the metal bellows against the adjustable mirror mount plate. The rear optical mount with the motor for wavelength tuning and/or selection is designed in the same way. One metal bellow may be used between the laser tube and the adjustable mount plate. The motor is controlling the position of the rear adjustable mounting plate.

In the second preferred embodiment of FIG. 6, the wavelength selection unit 24 either comprises a prism 22 with a highly reflecting surface 23, or comprises the prism 22 located adjacent or proximate to the highly reflecting surface 23. The wavelength selection unit 24 comprising the prism 22 and the highly reflecting surface 23 is shown located within the resonator and the laser gas volume of the excimer laser. Alternatively, the highly reflecting surface 23 is outside the laser gas volume, while the prism 22 remains inside the laser gas volume.

The resonator is defined between the highly reflecting surface 23 and an outcoupling mirror 30. The mirror mount, as described above, is used for adjusting the position of the outcoupling mirror 30 for optimizing important output beam characteristics, such as output power, direction, and absolute linear position.

The outcoupling mirror 30 preferably transmits a portion of the light, or resonating spectral band, incident upon it and reflects the rest. Alternatively, other conventional outcoupling techniques may be incorporated into the embodiments of the present invention. In any event, the portion of the resonating band that passes the outcoupling mirror 30 comprises the emitted output beam 32 of the laser. The portion of the resonating band that reflects from the outcoupling mirror 30 either continues to resonate until it is outcoupled by the outcoupling mirror 30, or is apertured out by, e.g., an aperture on the laser active gas housing, or is otherwise expelled from the resonating band, such as by reflection or dispersion away from the optical axis of the system, or by absorption.

Between the outcoupling unit 31 and the highly reflective surface 23 is the discharge chamber 27 including electrodes 25A and 25B and a cavity filled with laser active gas between the electrodes 25A and 25B. The electrodes 25A and 25B are responsible for exciting ground state atoms which de-excite and emit photons of light collectively comprising a band of light known as the broadband emission spectrum of the excimer laser. In the case of an $F_2$-excimer laser, the broadband spectrum includes two resolvable, yet closely-spaced (separated by @ 100 pm) lines. As is clear from its name, the dimer responsible for emission in the $F_2$-excimer laser is $F_2$.

The entire volume of laser active gas need not be located fully within the cavity of the discharge chamber between the electrodes 25A and 25B, as is preferred. In an alternative embodiment, the laser active gas is enclosed within a "housing" having outer boundaries beyond the discharge chamber 27. The housing is bounded at one end (at left) by a flange or its functional equivalent, which either is the adjustment mount 21A or is attached to or located substantially near the adjustment mount 21A. The adjustment mount 21A, in turn, is attached to the prism 22 and highly reflecting surface 23 of the preferred embodiment of FIG. 6. The housing, and the laser gas volume, are bounded at the other end by the outcoupling unit 31.

At one end of the housing, a wavelength selection unit 24 comprises a flange for closing off the housing, a wavelength adjustment mount 21A, which may be the flange, and nevertheless serves to optimize important output beam characteristics, a highly reflecting surface serving as one end of the resonator and a prism preferably for selecting one of two closely spaced lines. At the other end of the housing, the outcoupling unit 31 outcouples the resonating band, closes off the laser active volume and adjusts and thereby optimizes important characteristics of the output beam.

Many advantages are realized by the second preferred embodiment of FIG. 6. A wavelength selection unit 24 is located within the laser active volume, thus allowing the resonator to be not significantly larger than the length of the laser active volume. The resonating band need not traverse any absorptive and dispersive windows to move between the laser active volume and the wavelength selection unit 24. The wavelength selection unit 24 within the laser active gas is also easily located within the resonator itself to minimize radiation losses and resonator and beam delivery path length. Additional resonator lengths for either the wavelength selection unit 24 or the outcoupling unit 31 need not be evacuated and high expenditures for vacuum products are avoided.

An excimer laser arrangement of the present invention has a line selection unit located either preferably in the laser gas volume, or alternatively one surface of the line selection unit is in contact with the laser gas volume. In either case, and most especially in the preferred case, optical losses and energy usage are reduced. Additionally, a separate evacuatable or purgeable optics block is not necessary, yet the line selection unit is shielded from the air.

Figure 7:
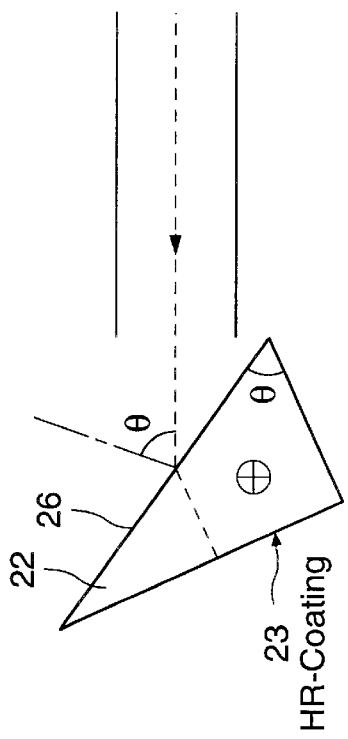
FIG. 7 shows a prism including a front surface and a back surface aligned according to the second preferred embodiment of the present invention.

FIG. 7 shows a prism 22 according to a preferred embodiment of the present invention. As mentioned, the prism is located within the laser gas volume. If the laser active volume includes fluorine gas, which it clearly does in the case of the $F_2$-excimer laser, then only a few materials may be used that are both fluorine-proof and transparent to ultraviolet light around the emission wavelength of the excimer laser, e.g., around 157 nm for the $F_2$-excimer laser. Among them, and preferred, is $CaF_2$. $MgF_2$ may also be used. Other ultraviolet transparent materials such as crystalline quartz and fused-silica may be used when the invention is incorporated into a laser other than one including a corrosive material such as fluorine gas. Sapphire ($Al_2O_3$) may be used when the emission wavelength of the excimer laser being used is above substantially 180 nm.

The prism 22 preferably has a front surface 26 which is aligned at Brewster's angle to the incident propagation direction of the resonating band that impinges the front surface 26 of the prism 22. In this way, rays of the resonating band are substantially entirely transmitted through the front surface 26.

The prism preferably has a back surface with a coating which has been, e.g., deposited such that the back surface of the prism 22 is the highly reflective surface 23 of FIG. 6. The coating is preferably a fluoride coating to minimize the corrosive effects of the fluorine gas surrounding the coating. The coating is preferably highly reflective such that only a very minimal amount of intensity of the rays travelling within the prism 22 are not reflected back along the optical path along which the rays of the resonating band entered the front surface of the prism 22. Another material may be used besides a fluoride if it has the two properties of being highly reflective around the wavelength of the resonating band of the excimer laser being used, and being resistant to corrosive attack by the laser active gas. The resonating band reflects from the back surface of the prism back along its optical path through the laser active gas.

Referring back to FIG. 6, although it's length is drastically shortened due to the features of the present invention, the outcoupled (emitted) beam from the excimer laser resonator then traverses a segment of evacuated laser beam path 36. A short distance from the outcoupling unit 31 is an electrically insulating component 29 inserted into the beam path 36 for galvanic separation of the discharge chamber from the rest of the beam path 36. The galvanic separator preferably comprises a ceramic material.

Between the end of the laser active volume which includes the wavelength selection unit 24 and the discharge chamber 27, and between the discharge chamber 27 and the galvanic separation component 29, is anti-vibration hardware 28. The anti-vibration hardware 28 preferably comprises flexible or diaphragm bellows to neutralize vibration. Standard vacuum components may be used throughout the system for maintaining the vacuum throughout the beam delivery path outside the discharge chamber 27. Any flanges may comprise, e.g., Klein-Flange components. A roughing pump 35 backed turbomolecular pump 34, e.g., may be connected through an integral T-valve to the beam delivery path, wherein the pressure is monitored using a standard gauge 33 and preferably stabilized and maintained at a constant when the output beam is being used for photolithography or other fabrication or research.

What is claimed is:

1. A molecular fluorine laser, comprising:
    a discharge chamber containing a laser active gas and a pair of spaced-apart electrodes for genertng a spectral band including a plurality of closely-spaced spectral lines in a wavelength range between 157 nm and 158 nm;
    an optical resonator; and
    at least one tunable wavelength selection optic: selecting one of said plurality of closely-spaced lines; suppressing one or more other lines of said plurality of closely-spaced lines; and narrowing the selected line by selecting a range of wavelengths within said selected line and suppressing other wavelengths within said selected line, to produce a narrowband output emission of said laser.

2. The laser of claim 1, wherein said at least one tunable wavelength selection optic includes at least one optic selected from the group of wavelength selection optics consisting of a birefringent plate, a prism, a grating, an etalon, and a single plate having a pair of reflecting surfaces which behaves like an etalon.

3. A method of tuning a laser, comprising the steps of:
    operating a molecular fluorine laser having a plurality of characteristic spectral emission lines each having a wavelength around 157 nm, and including a gain medium including molecular fluorine, and a resonator including a tunable wavelength selection optic to generate a laser beam;
    measuring a spectral characteristic of a beam generated by the laser;
    selected one of the plurality of characteristic spectral emission lines including a first selected wavelength range around 157 nm by suppressing one or more others of the plurality of characteristic spectral emission lines and other wavelengths than the first selected wavelength range within the selected one of the plurality of characteristic emission lines to line-narrow the selected line; and
    tuning the selected wavelength range by controlling said tunable wavelength selection optic to select a second selected wavelength range within the selected one of the plurality of characteristic emission lines to produce a desired beam spectral characteristic.

4. The method of claim 3, wherein said tuning step includes rotating said tunable wavelength selection optic.

5. The method of claim 3, wherein said tunable wavelength selection optic includes at least one optic selected from the group of wavelength selection optics consisting of a birefringent plate, a prism, a grating, an etalon, and a single plate having a pair of reflecting surfaces which behaves like an etalon.

6. The laser of claim 3, wherein said tunable wavelength selection optic includes a prism.

7. The laser of claim 3, wherein said tunable wavelength selection optic includes a grating.

8. The laser of claim 3, wherein said tunable wavelength selection optic includes an etalon.

9. The laser of claim 3, wherein said tunable wavelength selection optic includes an optical element for etalonning the beam.

* * * * *